UNITED STATES PATENT OFFICE.

WOLCOTT C. FOSTER, OF RUTHERFORD, NEW JERSEY.

PROCESS OF BASE-EXCHANGING.

1,385,124. Specification of Letters Patent. Patented July 19, 1921.

No Drawing. Application filed January 18, 1917. Serial No. 143,015.

*To all whom it may concern:*

Be it known that I, WOLCOTT C. FOSTER, a citizen of the United States, and a resident of Rutherford, in the county of Bergen and State of New Jersey, have invented certain new and useful Improvements in Processes for Base-Exchanging, of which the following is a specification.

My invention relates to a new method for regenerating base-exchanging materials and refers particularly to the regeneration of those base-exchanging materials suitable for the softening of water.

One object of my invention is an economical and effective process for regenerating base-exchanging materials which have been used for the softening of water.

Another object of my invention is a method for accomplishing the above result by means of a minimum amount of the regenerating solution.

Another object of my invention is a method for regenerating a maximum amount of the base-exchanging material.

Another object of my invention is a method for regenerating a maximum amount of the base-exchanging material in a minimum duration of time.

These and other objects of my invention will be evident upon a consideration of my specification and claims.

It has been found that a valuable method for softening water consists in passing the water through a mass, or filter-bed, of certain materials which possess the property of exchanging their bases for the calcium or magnesium of the salts dissolved in the water during the process of such passage. During this operation the base-exchanging materials are converted into a condition where their ability to exchange further quantities of their bases for the calcium or magnesium in the water compounds is entirely ineffective or ineffective to a degree as to render them practically useless for the purpose desired.

Among the base-exchanging materials, I mention the base-exchanging silicates, and the natural and the so-called artificial zeolites, although it is to be understood that I do not limit myself to these particular compounds or materials, as my process is adaptable to other base-exchanging materials having the mentioned regenerative properties.

To render these base-exchanging materials suitable for re-use, it has been suggested to regenerate them by passing a saline, or sodium chlorid, solution through the mass, or filter-bed, in the same direction as the flow of the water to be softened, in an attempt to have the base-exchanging materials exchange their calcium or magnesium base for the sodium of the sodium chlorid. This method has proven unsatisfactory as it requires excessive quantities of salt, or sodium chlorid, and regenerates only a comparatively small proportion of the calcium and magnesium bases of the base-exchanging materials, and in addition, such exchange as is made is made slowly and only by the use of large quantities of the saline, or sodium chlorid solution. There results, therefore, a considerable loss of salt, or sodium chlorid, a loss of time necessary for the regeneration, and the production of a base-exchanging material of greatly decreased efficiency.

My process overcomes these difficulties and presents a method whereby a greatly increased quantity of the base-exchanging material can be regenerated with a less expenditure of cost of material, and of time.

My invention, in a broad way, comprises passing a regenerating solution through the mass, or filter-bed, of the base-exchanging materials in a direction which is the reverse of the direction in which the water to be softened has been passed through the mass, or filter-bed.

Experiments show that during the passage of the water to be softened through the mass, or filter-bed, of the base-exchanging materials, there is a more or less uniform decrease of exchanged base from the point of entrance of the water to the point of its exit; that is, at any time period of passage, considerably more calcium, or magnesium, salts of the base-exchanging material are present at that portion of the mass, or filter-bed, at which the water enters, than are present at that portion at which the water leaves the mass, or filter-bed. In my process, therefore, I pass the regenerating solution through the mass, or filter-bed, from its point of least base exchange toward that of the greatest base exchange.

This reversal of flow produces the unexpected result of a greatly increased exchange of base, with considerably less quantities of the regenerating material in a much less period of time than are produced by a non-reversal of flow.

I have further found that these advantages can be considerably enhanced by interrupting this reversed flow of the regenerating solution, passing water through the mass, or filter-bed, in the direction of the regenerating solution, interrupting the flow of water and again passing the regenerating solution through the mass, or filter-bed, in the same direction as before, or by a final washing in the direction of the flow of the regenerating solution.

One method of following my invention in relation to materials used for water softening is as follows:

When the passage of the water to be softened has converted the base-exchanging material into a condition where it is necessary, or advisable, to regenerate the materials, the flow of the water is interrupted. If desirable, the mass, or filter-bed, of material may be loosed up by forcing water or air through the material in a reverse direction to the flow of the above-mentioned water, it being evident that the desired result may also be obtained by any satisfactory mechanical means. A regenerating solution, as, for instance, a solution of salt, is then forced through the mass, or filter-bed, in a reverse direction to the flow of the water to be softened, and the operation continued until the satisfactory regeneration of the materials of the mass, or filter-bed, is obtained. An increased amount of regeneration can be obtained, and less regenerating material may be used, if from time to time the regenerating solution is washed out of the mass, or filter-bed, by means of water.

By regenerating materials I mean those materials and compounds which, under the conditions of my invention, will exchange their salt-forming contents for the salt-forming contents of the material to be regenerated.

I do not limit myself to the particular substances mentioned as all of them may be changed without going beyond the scope of my invention as described and claimed.

What is claimed, is:

1. The process of regenerating base-exchanging materials used in the softening of water which comprises interrupting the flow of the water to be softened, passing a regenerating material through the base-exchanging materials in a direction opposite to that of the flow of water to be softened, washing the base-exchanging materials and renewing the flow of the regenerating material in the same direction as previously employed.

2. The process of regenerating base-exchanging materials used in the softening of water which comprises interrupting the flow of the water to be softened, loosening the base-exchanging materials, passing a regenerating material through the base-exchanging materials in a direction opposite to that of the flow of water to be softened, washing the base-exchanging materials and renewing the flow of the regenerating material in the same direction as previously employed.

3. The process of regenerating base-exchanging materials used in the softening of water which comprises interrupting the flow of the water to be softened, loosening the base-exchanging materials, passing a solution of a salt of an alkali metal through the base-exchanging materials in a direction opposite to that of the flow of water to be softened, washing the base-exchanging materials and renewing the flow of the solution of a salt of an alkali metal in the same direction as previously employed.

4. The process of regenerating base-exchanging materials which comprises passing a regenerating material through the mass from that portion of the base-exchanging material possessing the smaller amount of base to be exchanged toward that portion possessing the larger amount of base to be exchanged, washing the base-exchanging materials, and renewing the flow of the regenerating material in the same direction as previously employed.

5. The process of converting the calcium and magnesium salts of base-exchanging materials into the sodium salts, which comprises constantly passing a solution of a sodium compound possessing the property of exchanging its sodium content for the calcium and magnesium from that portion of the base-exchanging material possessing the smaller amount of calcium and magnesium salts through the mass toward that portion possessing the larger amount of said salts until the regeneration of the salts of the base-exchanging material is complete.

6. The process of converting the calcium and magnesium salts of base-exchanging materials into the sodium salts, which comprises passing a constant flow of a regenerating solution from that portion of the base-exchanging material possessing the smaller amount of calcium and magnesium salts through the mass toward that portion possessing the larger amount of said salts until the regeneration of the salts of the base-exchanging material is complete.

Signed at Rutherford, in the county of Bergen and State of New Jersey, this seventeenth day of January, 1917.

WOLCOTT C. FOSTER.

Witnesses:
FRANK AMERY,
R. W. H. CAMPBELL.